July 11, 1950  S. H. HAY ET AL  2,514,491
ANIMAL DRINKING CUP
Filed Aug. 16, 1946
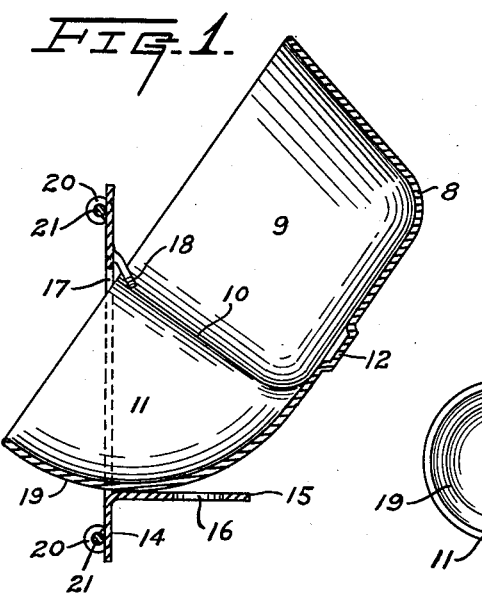
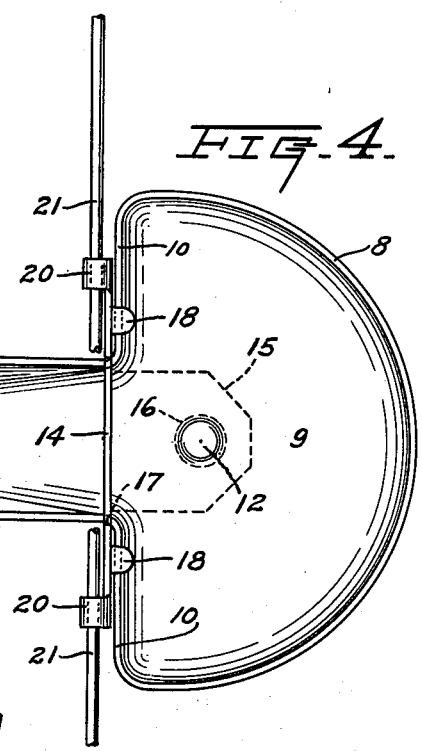
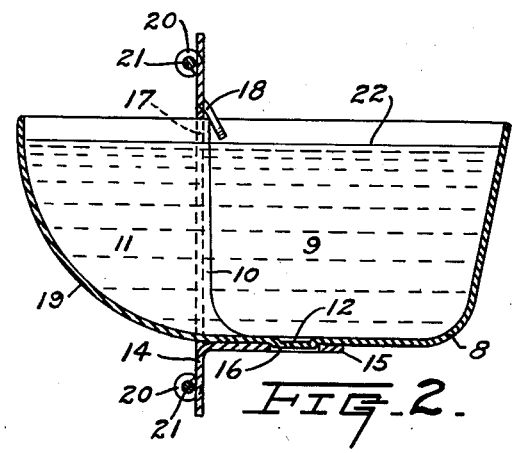
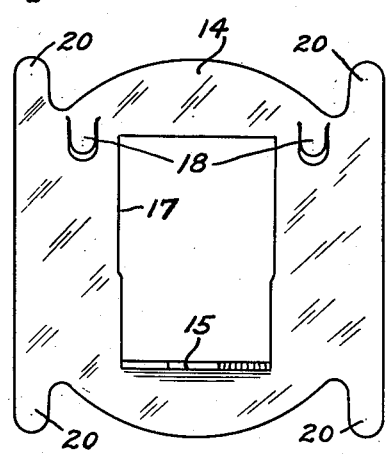
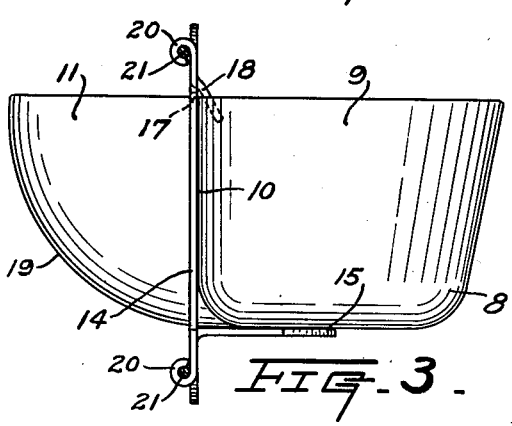
INVENTORS
S. H. Hay
BY F. B. Hay, Jr.
Lieber & Lieber
ATTORNEYS.

Patented July 11, 1950

2,514,491

UNITED STATES PATENT OFFICE 2,514,491

ANIMAL DRINKING CUP

Steven H. Hay, Racine, and Frank B. Hay, Jr., Sturtevant, Wis.

Application August 16, 1946, Serial No. 690,960

6 Claims. (Cl. 119—18)

Our invention relates in general to improvements in the manufacture of feeding and watering appliances for caged or otherwise confined birds and beasts, and relates more specifically to improvements in the construction of animal drinking cups or the like formed primarily of sheet metal.

The principal object of the present invention is to provide an improved animal feeding or watering cup which is simple and durable in construction, and which may be readily detachably suspended from an animal confining cage or the like.

When raising certain fur-bearing animals such as mink, the creatures are confined in cages or pens, and must be carefully fed and watered especially during breeding periods. It is therefore customary to provide each zone of confinement with a drinking receptacle of limited capacity, and in order to prevent accidental spilling of the liquid and undue annoyance of the caged animals, these watering cups should be susceptible of firm support and should also be adapted to be supplied with fresh drinking water without requiring the attendants to enter the pens. These watering receptacles should also be formed of non-breakable corrosion resistant material in order to avoid loss and contamination of the liquid, and they should also be readily removable for cleaning so as to facilitate maintenance of sanitary conditions.

It is therefore a more specific object of our present invention to provide an improved animal watering receptacle which meets all of the above mentioned requirements, and which may also be manufactured and sold at moderate cost for diverse uses.

Another specific object of the invention is to provide an improved drinking cup assemblage which may be readily constructed of rust-resistant sheet metal with the aid of punches and dies, and which is also adapted to be firmly and conveniently attached to the wall or confining wire of a pen or cage.

A further specific object of this invention is to provide an improved drinking basin and support therefor, wherein the basin may be quickly and readily applied to or removed from the support, and may also be supplied with commodity without entering the animal confining zone with which the assemblage is associated.

Still another specific object of our invention is to provide an attractive sheet metal receptacle for liquid or food, which may be readily cleaned and sterilized and which may also be mounted at any desired position upon a wire mesh wall or the like.

These and other objects and advantages of the invention will be apparent from the following detailed disclosure.

A clear conception of the features constituting our present improvement, and of the mode of constructing and utilizing animal drinking cups embodying these features, may be had by referring to the drawing accompanying and forming a part of this specification wherein like reference characters designate the same or similar parts in the various views.

Fig. 1 is a central vertical section through one of our improved drinking cup assemblages, showing the cup in the act of being applied to its normal support;

Fig. 2 is a similar section through the same assemblage, showing the cup mounted upon the support and supplied with liquid;

Fig. 3 is a side elevation of the same cup and support in assembled condition;

Fig. 4 is a top view of the same cup and support assemblage; and

Fig. 5 is a plan view of the support alone, before attachment thereof to the suspension wires.

While our invention has been shown and described herein as being especially applicable to drinking cups of limited capacity adapted to be suspended from the confining wire mesh of mink pens or the like, it is not our desire or intention to thereby unnecessarily restrict the scope or limit the utility of the improvements which may be more generally applied to other types of receptacles.

Referring to the drawing, the improved animal drinking cup assemblage shown therein, comprises in general a receptacle or cup 8 having a relatively wide semi-circular rear commodity receiving basin 9 partially bounded by flat upright front walls 10 which are separated by an intervening narrower drinking spout 11 communicating centrally with the supply basin, the bottom of the bowl or basin 9 being provided with a depending circular lug 12; and a flat mounting plate or support 14 having a resilient rearwardly projecting shelf 15 forming a bearing cooperable with the bottom of the cup 8 and provided with an opening 16 for receiving the cup lug 12, the support 14 also having a central cut-out 17 for receiving the cup spout 11 and being provided with hooks 18 disposed above the cut-out 17 and shelf 15 for engaging the upper edges of the upright cup walls 10.

The receptacle or cup 8 is preferably drawn from a single blank of non-corrosive sheet-metal such as stainless steel, but may also be fabricated of plastic, glass, die-cast metals, and other kinds of sheet-material; and the lower front wall 19 of the drinking spout 11 is curved along an arc struck about a center disposed near the upper edges of the vertical cup walls 10. The upper brim edge of the cup 8 especially at the front and sides of the drinking spout 11, should be rounded so as to avoid injury to the drinking animals; and while these unitary cups 8 are exceedingly light they are still very strong and unbreakable, and can be readily cleaned because of the elimination of sharp corners therefrom.

The flat mounting plate or support 14 is likewise preferably formed from a single blank of non-corrosive resilient material, with the aid of punches and dies or otherwise, and while the shelf 15 and hooks 18 are quite stiff, they should be slightly deflectable under pressure so as to permit the cap 8 to be snapped into position and firmly held in place when the parts are assembled. Each of the cup supports 14 is also provided with four suspension projections or tongues 20 which are adapted to be wrapped snugly around horizontal supporting wires 21 as shown, and these supporting wires may be part of the wire mesh enclosure of an animal breeding or confining cage or pen.

When the parts of the improved drinking cup assemblages have been properly constructed as above described, each of the mounting plates 14 may be readily firmly attached to parallel upper and lower wires 21 by snugly wrapping the flexible integral tongues 20 of the support about the adjacent suspension wires, with the aid of a pair of pliers or the like. Such attachment of each supporting plate 14 may be effected in any desired location preferably externally of the breeding pen, and the supports thereafter remain in place, but may be readily removed if so desired.

In order to apply a receptacle or cup 8 to a suspended support 14, it is only necessary to initially insert the drinking spout 11 of the cup through the cut-out 17 of the supporting plate with the hooks 18 overlying the upper edges of the adjacent cup walls 10, and to thereafter swing the bowl 9 downwardly and inwardly toward the shelf 15. The curved front wall 19 of the spout 11 will then ride smoothly along the top of the shelf 15, and as the front walls 10 of the cup 8 approach the flat plate 14, the lower cup lug 12 will snap into the shelf-opening 16 and will effectively clamp the cup walls 10 against the rear surface of the supporting plate. The basin or bowl 9 may subsequently be supplied with liquid 22 in any desired quantities, and will effectively retain this liquid for free access to the animals from within the breeding zone through the spout 11.

If it becomes desirable to remove a suspended cup, or to spill the liquid 22 therefrom, it is only necessary to swing the rear end of the cup 8 upwardly. This may be done externally of the pen and with relatively slight pressure applied upwardly to the rear portion of the upper brim of the supply basin 9, thus releasing the locking lug 12 from the opening 16 in the shelf 15, and subsequently causing the front lower curved wall 19 of the spout 11 to ride smoothly along the top of the shelf until the upper edges of the cup walls 10 can be released from the hooks 18. The cup 8 may then be freely withdrawn from the cut-out 17, hooks 18, and shelf 15 for cleaning; and it is to be noted that application, filling, and removal of the cup 8 may all be effected without entering the animal confining zone.

From the foregoing detailed description of the construction and operation of our invention, it will be apparent that we have provided an improved drinking cup assemblage which besides being simple and durable in construction, may be conveniently suspended from the enclosing wall of an animal confining pen, and may also be readily applied or removed from the exterior of the pen. The improved sheet metal cup 8 and support 14 may obviously be manufactured from corrosion resistant material in any convenient manner, and at moderate cost; and the formation of these parts is such that they may be easily assembled and dismantled and maintained in highly sanitary condition at all times. The location and shape of the spout 11 besides facilitating assembly and dismantling of the unit, also permits introduction of desirable quantities of fresh liquid 22 to the supply basin 9 from without the pen, thus avoiding undesirable annoyance to the confined animals. The retaining lug 12, shelf 15 and hooks 18 afford simple but highly effective means for maintaining the cup 8 in proper position upon and against the support 14, and the tongues 20 also provide sturdy means for conveniently attaching the plate 14 to the wires 21. The entire unit presents a highly attractive appearance, and the improvement has proven very satisfactory and successful in actual use.

It should be understood that it is not our desire to limit the invention to the exact details of construction and operation or to the precise mode of producing the parts, herein shown and described, for various modifications within the scope of the appended claims may occur to persons skilled in the art; and as hereinbefore indicated, the cups and supports may be fabricated of diverse materials.

We claim:

1. A drinking cup assemblage for cages, comprising, an upright sheet-metal supporting plate having a cut-out and being provided laterally of the upper edge of the cut-out with a pair of hooks and along the lower edge of the cut-out with a resilient shelf, both said hooks and said shelf extending in the same direction away from one side face of said plate, and a sheet-metal cup having a relatively wide supply bowl and a narrower drinking spout connected to said bowl by transverse walls, said shelf and bowl having interlockable parts and said narrower spout being insertable through said cut-out while the upper edges of said walls are engageable with said hooks to cause said bowl to deflect and interlock with and to thereafter rest upon said shelf when the cup is applied to the plate.

2. A drinking cup assemblage for cages, comprising, an upright sheet-metal supporting plate having a cut-out and being provided laterally of the upper edge of the cut-out with a pair of integral hooks and along the lower edge of the cut-out with an integral deflectable shelf having an opening therein, both said hooks and said shelf extending in the same direction away from one side face of said plate, and a sheet-metal cup having a relatively wide supply bowl provided with a projection and a narrower drinking spout connected to said bowl by integral transverse walls, said narrower spout being insertable through said cut-out and the upper edges of said walls being engageable with said hooks to cause said projection to snap into said shelf opening and said bowl to rest upon said shelf when the cup is applied to the plate.

3. A drinking cup assemblage for cages, comprising, an upright sheet-metal supporting plate having an approximately rectangular cut-out and being provided laterally of the upper edge of the cut-out with a pair of integral hooks and along the lower edge of the cut-out with an integral resilient shelf, both said hooks and said shelf extending in the same direction away from one side face of said plate, and a sheet-metal cup having a relatively wide supply bowl and a narrower drinking spout connected to said bowl by integral transverse walls, said shelf and bowl having interlockable parts and said narrower spout being snugly insertable through said cut-out while the upper edges of said walls are engageable with said hooks to cause said bowl to interlock with and to thereafter rest firmly upon said shelf when the cup is applied to the plate.

4. A drinking cup assemblage for cages, comprising, an upright sheet-metal supporting plate having a cut-out and being provided laterally of the upper edge of the cut-out with a pair of integral downwardly directed hooks and along the lower edge of the cut-out with an integral resilient horizontal shelf having a latch formation thereon, both said hooks and said shelf extending in the same direction away from one side face of said plate, and a sheet-metal cup having a relatively wide supply bowl provided with a complementary latch formation and a narrower drinking spout connected to said bowl by integral upright transverse walls, said narrower spout being snugly insertable within and swingable through said cut-out while the upper edges of said walls are pivoted beneath said hooks to cause said formations to interlock and to also cause said bowl to rest upon said shelf and said walls to engage said plate face when the cup is applied to the plate.

5. A drinking cup assemblage for cages, comprising, an upright sheet-metal supporting plate having a cut-out and being provided laterally of the upper edge of the cut-out with a pair of hooks and along the lower edge of the cut-out with a shelf having a latch opening, both said hooks and said shelf extending in the same direction away from one side face of said plate, and a sheet-metal cup having a relatively wide supply bowl provided with a latch projection and a narrower drinking spout of approximately the same width as said cut-out connected to said bowl by transverse upright walls, said narrower spout being swingable upwardly and rearwardly through said cut-out while the upper edges of said walls are pivoted beneath said hooks to cause said bowl to interlock with said shelf opening when the spout has been swung through the cut-out sufficiently to cause said walls to engage said plate face.

6. A drinking cup assemblage for cages, comprising a unitary upright sheet-metal supporting plate having an approximately rectangular cut-out and being provided laterally of the upper edge of the cut-out with a pair of integral downwardly directed hooks and along the lower edge of the cut-out with an integral resilient horizontal shelf having an opening, both said hooks and said shelf extending in the same direction away from one side face of said plate, and a sheet-metal cup having a relatively wide supply bowl provided with a lug and a narrower drinking spout of approximately the same width as said cut-out connected to said bowl by upright transverse walls, said narrower spout being swingable through said cut-out and the upper edges of said walls being disposable beneath said hooks to cause said bowl lug to interlock with said shelf opening when the spout has been swung through the cut-out sufficiently to cause said walls to contact said plate face.

STEVEN H. HAY.
FRANK B. HAY, Jr.

REFERENCES CITED

The following references are of record in the file of this patent:

UNITED STATES PATENTS

| Number | Name | Date |
| --- | --- | --- |
| 156,348 | Hendryx | Oct. 27, 1874 |
| 199,115 | Smith | Jan. 8, 1878 |
| 978,010 | Faust | Dec. 6, 1910 |
| 1,154,768 | Herold | Sept. 28, 1915 |
| 1,546,992 | Oppman | July 21, 1925 |
| 1,602,000 | Custer | Oct. 5, 1926 |
| 1,693,113 | Hampel | Nov. 27, 1928 |
| 1,719,769 | Kaufman | July 2, 1929 |
| 1,755,706 | St. George | Apr. 22, 1930 |
| 1,850,351 | Markey et al. | Mar. 22, 1932 |
| 1,869,901 | Le Fever | Aug. 2, 1932 |
| 1,879,332 | Kulp | Sept. 27, 1932 |

FOREIGN PATENTS

| Number | Country | Date |
| --- | --- | --- |
| 510,968 | Great Britain | Aug. 11, 1939 |